Jan. 11, 1927.  1,613,938
A. V. CONOVER
DAY AND NIGHT BEACON
Filed June 13, 1924   2 Sheets-Sheet 1
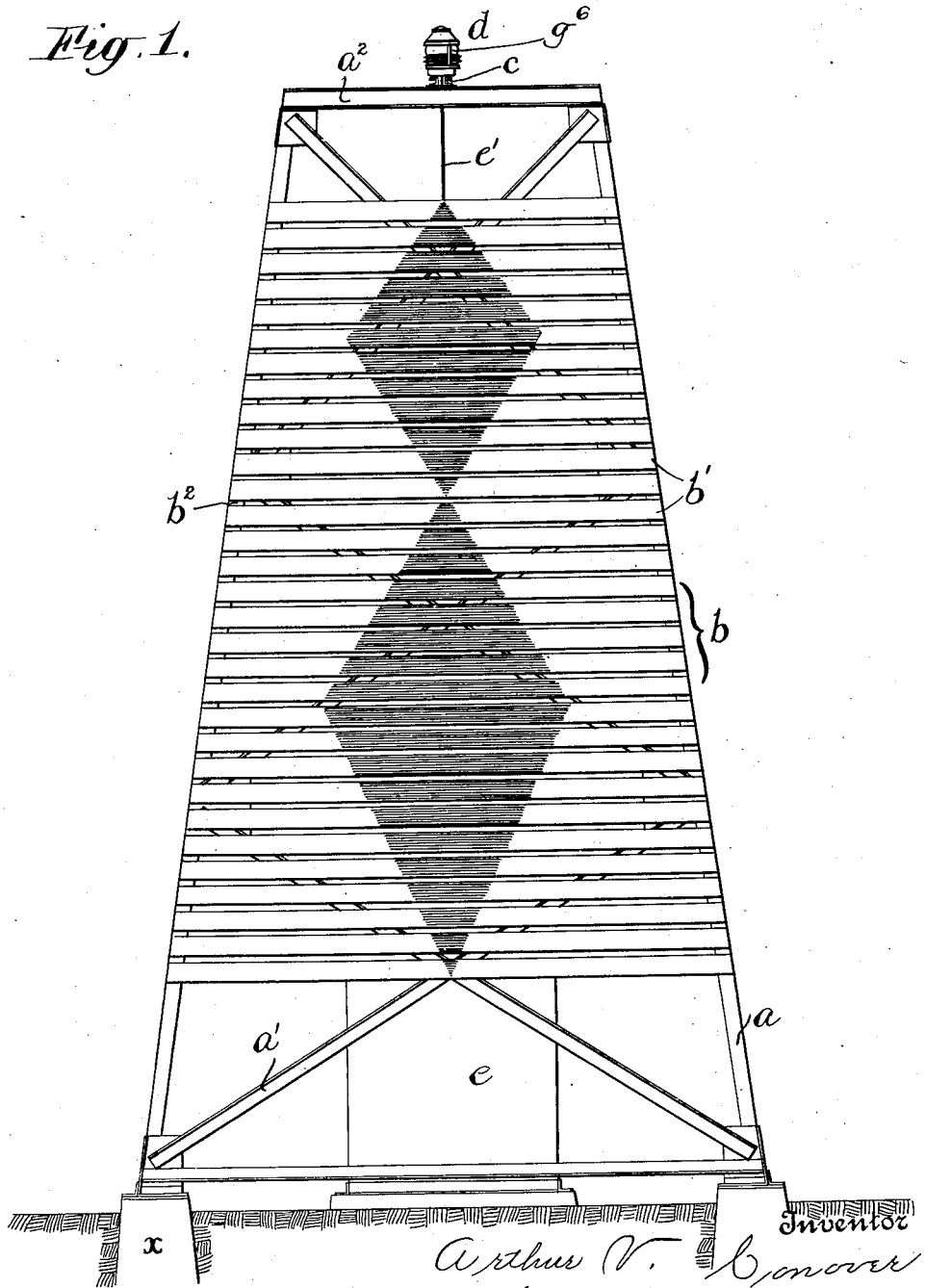

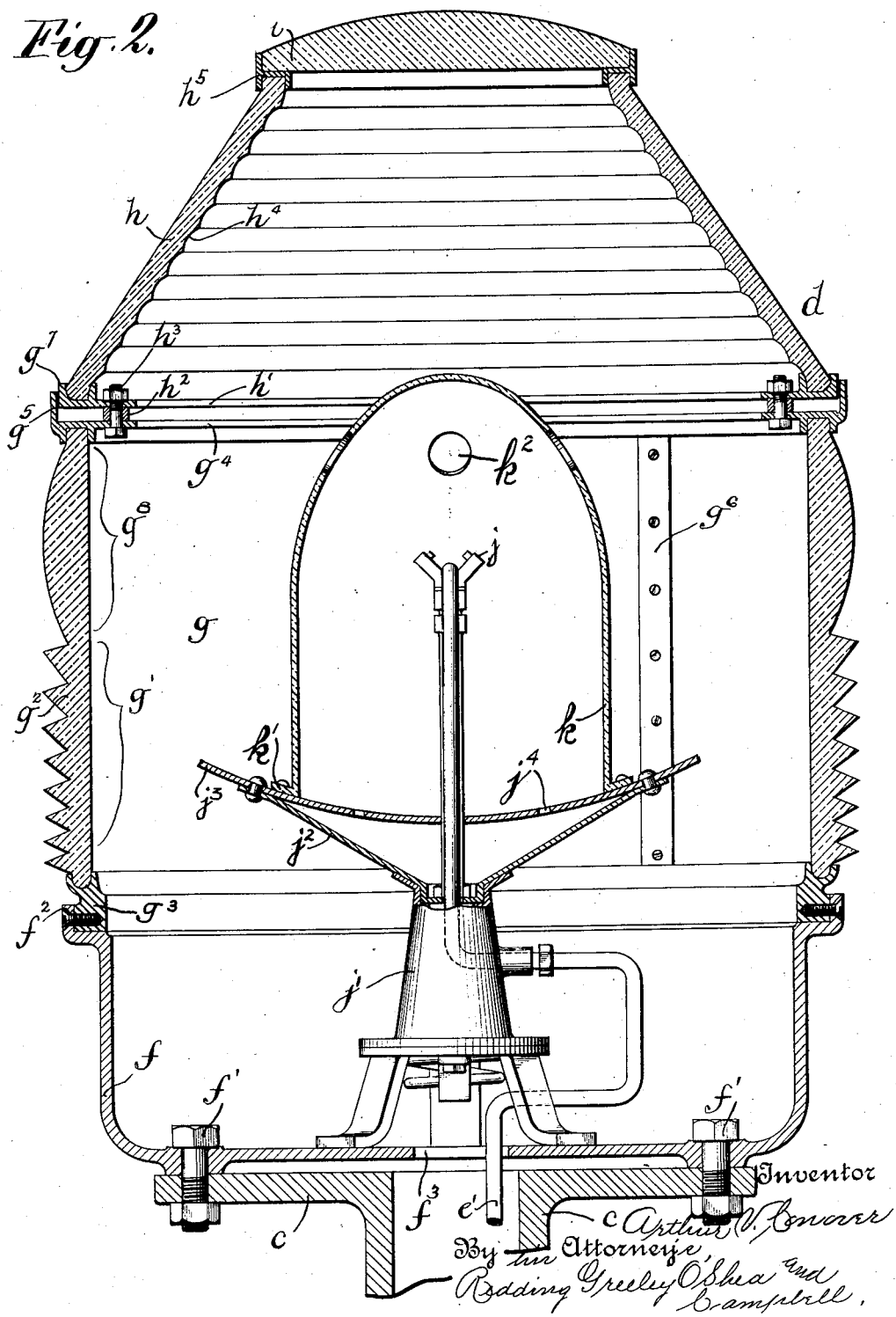

Patented Jan. 11, 1927.

1,613,938

UNITED STATES PATENT OFFICE.

ARTHUR V. CONOVER, OF PHILADELPHIA, PENNSYLVANIA, ASSIGNOR TO INTER-FLASH SIGNAL CORPORATION, OF NEW YORK, N. Y., A CORPORATION OF NEW YORK.

DAY AND NIGHT BEACON.

Application filed June 13, 1924. Serial No. 719,753.

This invention relates to a beacon or route marker particularly designed for air travel whereby a specified route or overland trail may be clearly designated and distinguishable to travelers in aircraft either by day or by night. The invention contemplates the provision of a series of towers high enough to be visible for a long distance in the day time and bearing distinguishing characteristics on all sides so that a particular route may be selected and followed by a traveler in the air coming from any direction. A series of such towers may be distributed along any desired route across country and will serve as unmistakable landmarks whereby the trail may be easily followed and at the same time due to the particular distinguishing characteristics displayed upon each tower when necessary will serve to distinguish the route from other cross country routes to other points. In order that the beacon may be serviceable in the dark as well as in the day light, it is proposed to surmount the tower with a light source so surrounded by a lens or lenses as to throw a beam or beams of light upwardly and outwardly in all directions above the horizontal so that the said light may be visible from any point of the compass as well as from directly overhead. In order that the beacon light may serve to distinguish the route in the same manner as the insignia on the sides of the tower when such distinction is desirable it is proposed to color a portion of the light emitted from the beacon whereby the combination of colors will serve to indicate the particular route. These and other objects of the invention and the means for their attainment will be more apparent from the detailed description of the accompanying drawings which illustrate a preferred embodiment of the invention. In the drawings:

Figure 1 is a view in elevation of the day and night beacon according to the present invention showing a lens enclosing a light and surmounting a tower upon the sides of which indications of the desired kind may be displayed.

Figure 2 is a view in vertical section and on an enlarged scale of the lens and source of light surmounting the tower.

In Figure 1 there has been disclosed a tower which is formed of four sides, but it will be readily understood that a tower of any number of sides may be equally applicable in some situations. The tower is formed as the frustrum of a pyramid and comprises a frame work $a$ secured in any convenient manner upon a suitable foundation $x$ and re-enforced in suitable manner by cross braces $a'$. The tower is of such a height and of such width as to be readily distinguishable from the air at a considerable distance and very probably a tower of approximately 60 ft. in height will be found most desirable under average conditions. On each side of the tower and secured to the frame work is a perforate side $b$ formed of a plurality of horizontally disposed strips or boards $b'$ spaced from one another as at $b^2$ to afford as little wind resistance as possible. As an indication of the route or an identification of the particular tower in the day time it is proposed that the sides $b$ of the tower bear distinguishing markings of any desired character such, for example, as $b^3$. Such markings may be readily applied to the sides as by painting and a suitable form therefore may readily be devised having in mind the visibility of the same from a long distance. In the illustrated embodiment a pair of channels $c, c$ are shown surmounting the top frame member $a^2$ of the tower although it will be apparent that any type of support may be used in this situation. The night beacon or lamp indicated as a whole at $d$ is mounted upon the cross channels $c$. If the fuel for the light is acetylene, for instance, or other gas as will be found most convenient, a reservoir $e$ for such gas or a tank for the manufacture thereof may be disposed within the frame work of the tower as shown in Figure 1 and a pipe for the conduction of the gas between the lamp $d$ and the reservoir $e$ may be disposed anywhere within the confines of the tower and preferably supported upon the frame work as indicated at $e'$. Of course it will be understood that a light source other than a gas light may be found desirable in some situations.

Referring now to Figure 2 it will be observed that the lamp indicated as a whole at $d$ and which is carried in a bowl-shaped base $f$ bolted to the channels $c$ by bolts $f''$ comprises a sectional lens $g$, or ($g'$, $g^8$) supported upon the base $f$ and enclosing the source of light which is fed through the pipe $e'$. The lens as illustrated forms the subject matter of a co-pending application by the present applicant Serial No. 719,061, filed June 10, 1924, and no detailed description of its manufacture and use is deemed necessary in the present application. Suffice it to say that a cylindrical portion $g'$ of the lens is secured to a lower ring $g^3$ which in turn is removably secured to the base $f$ by means of the screws $f^2$. The cylindrical lens $g'$ is formed, in that portion thereof below the source of light, with a plurality of prismatic configurations $g^2$ whereby the light falling thereupon from the light source is deflected slightly above the horizontal to form an annular wedge of light in all directions. The upper portion $g^8$ of the cylindrical lens $g$ is formed plano-convex in cross section with the axis of this portion in the horizontal axis of the light source. The light emanating from this portion of the lens is spread both above and below the horizontal to form an annular wedge-shaped beam. Rigidly secured to the upper portion of lens $g$ is a ring $g^4$ preferably having an upturned flange $g^5$ which is spaced from the ring $h'$ of the dome portion $h$ and maintained in spaced relation by means of the spacing sleeves $h^2$ through which the connecting bolts $h^3$ pass. The dome $h$ which is frustro-conical in shape and formed interiorly with annular horizontally disposed flutes $h^4$ is adapted to direct the light falling upon the dome both horizontally and upwardly to complete that portion of the hemispherical beam of light above the light source. Secured to the upper edge of the lens $h$ is a ring $h^5$ to which is secured a bulls eye lens $i$ which may be of colored glass where a central spot of a different color is to be caused to appear in the hemisphere of light emanating from the lens.

As has been pointed out the source of light lies in the horizontal axis of the lens portion $g^8$. In the illustrated embodiment a burner $j$ is shown so disposed within the lens that the flame therefrom will lie substantially at the desired point and the burner may be supported in an appropriate manner with devices desired to produce an intermittent flow of gas whereby a flashing light may be obtained when desired. Such devices are not shown as they may take any effective form but may be housed within a base or casting $j'$ having mounted thereon a spider $j^2$ supporting a reflector $j^3$ designed to throw that portion of the light falling in a downward direction upwardly in order that it may not be lost. The reflector may conveniently be of a diameter just insufficient to intercept rays normally falling upon the lowermost prism $g^2$.

It has been found convenient to furnish the light for lamp $d$ by means of an acetylene burner as an intermittent flashing device may be readily incorporated in such a lamp with particularly advantageous and economical results. With such a flasher using acetylene gas it is highly desirable to provide a protector or chimney-like enclosure for the flame. It will be understood that the flame must be protected when burning from the drafts of air which might accidently extinguish it and at the same time the gas issuing from the burner must be supplied with an adequate supply of oxygen to insure ready ignition of the flame. These conditions may be readily satisfied in a chimney-like structure inasmuch as the heat generated by the flame will be sufficient to insure a steady overflow of heated air or products of combustion and a consequent inflow of fresh air to support combustion.

As a protection for a flame, therefore, a globe $k$ of transparent material is adapted to surround the burner and be secured by flanges $k'$ formed thereon to the reflector. The reflector $j^3$ is provided with apertures $j^4$ to admit air to support the combustion of the gas emitted by the burner $j$ and suitable vents $k^2$ may be formed in the upper portion of the globe $k$ to permit the escape of products of combustion.

It will be obvious that the invention is not limited to the use of gas in the production of light but that any kind of illuminant or electricity may be availed of in the production of the light source. Further the light may be steady or intermittent of any desired characteristic of light and dark period.

Furthermore situations are conceivable in which sufficient visibility is obtained by illuminating the tower at night.

Modifications in form, dimensions and arrangement of parts within limits may be made without departing from the spirit of the invention provided the described conditions are realized.

What I claim is:

1. In a route marker for air travel, in combination, a tower comprising a frame supporting a plurality of perforate sides and indicia of a route displayed on said sides respectively, a base for a lens supported on the top of said frame, a light source supported in said base, a transparent protector for said light source, a reflector supported in said base below said light source and a lens to direct a hemispherical beam of light supported on the base and enclosing with the base the light source transparent protector and reflector, a portion of said lens being differently colored to cause a portion of said beam to assume a different color.

2. In a route marker for air travel, in combination, a tower comprising a frame having sides and indicia of a route displayed on said sides, a base for a lens supported on the top of said frame, a light source supported in said base, a reflector supported in said base below said light source and a lens to direct a hemispherical beam of light supported on the base and enclosing with the base the light source and reflector, a portion of said lens being differently colored to cause a portion of said beam to assume a different color.

This specification signed this 3 day of June A. D. 1924.

ARTHUR V. CONOVER.